United States Patent
Weller

(10) Patent No.: US 12,147,523 B2
(45) Date of Patent: Nov. 19, 2024

(54) READER DEVICE AND METHOD OF CONFIGURING THE SAME

(71) Applicant: HID Global GmbH, Walluf (DE)

(72) Inventor: Gunther Weller, Gießen (DE)

(73) Assignee: HID Global GmbH, Wiesbaden (DE)

( * ) Notice: Subject to any disclaimer, the term of this patent is extended or adjusted under 35 U.S.C. 154(b) by 341 days.

(21) Appl. No.: 17/758,829

(22) PCT Filed: Dec. 22, 2021

(86) PCT No.: PCT/EP2021/087202
§ 371 (c)(1),
(2) Date: Jul. 14, 2022

(87) PCT Pub. No.: WO2022/144261
PCT Pub. Date: Jul. 7, 2022

(65) Prior Publication Data
US 2023/0039085 A1    Feb. 9, 2023

(30) Foreign Application Priority Data

Dec. 29, 2020  (EP) .................... 20217596

(51) Int. Cl.
*G06F 21/34*   (2013.01)
*G06F 12/08*   (2016.01)

(52) U.S. Cl.
CPC .............. *G06F 21/34* (2013.01); *G06F 12/08* (2013.01)

(58) Field of Classification Search
CPC ................................ G06F 21/34; G06F 12/08
See application file for complete search history.

(56) References Cited

U.S. PATENT DOCUMENTS

| | | |
|---|---|---|
| 5,679,945 A | 10/1997 | Renner et al. |
| 6,516,357 B1 | 2/2003 | Hamann et al. |
| 6,941,285 B2 | 9/2005 | Sarcanin |
| 7,369,982 B2 | 5/2008 | Leaming |
| 7,748,636 B2 | 7/2010 | Finn |
| 7,900,253 B2 | 3/2011 | Wendling et al. |
| 7,900,830 B2 | 3/2011 | Tran |

(Continued)

FOREIGN PATENT DOCUMENTS

| | | |
|---|---|---|
| CN | 101821715 B | 7/2014 |
| CN | 115280310 | 11/2022 |

(Continued)

OTHER PUBLICATIONS

"German Application Serial No. 20217596.4, Office Action mailed Aug. 14, 2023", with English translation, 3 pages.

(Continued)

*Primary Examiner* — Cheng-Feng Huang
(74) *Attorney, Agent, or Firm* — Schwegman Lundberg & Woessner, P.A.

(57) ABSTRACT

A reader device is configured to connect a physical token to a host device. The reader device may be updated by a local or central administration device forwarding configuration commands in accordance with a standard that is used to communicate with the physical token. This is achieved by emulating a virtual token when no physical token is present, and addressing the memory of the reader device storing the configuration settings in the same manner as a memory of the physical token.

18 Claims, 2 Drawing Sheets

(56) References Cited

U.S. PATENT DOCUMENTS

| | | | |
|---|---|---|---|
| 7,908,216 | B1 | 3/2011 | Davis et al. |
| 7,924,825 | B2 | 4/2011 | Dowling et al. |
| 7,971,238 | B2 | 6/2011 | Pan et al. |
| 8,700,827 | B2 | 4/2014 | Capomaggio |
| 8,745,754 | B2 | 6/2014 | Bhaskar et al. |
| 9,439,220 | B2 | 9/2016 | Levy et al. |
| 9,483,417 | B2 | 11/2016 | Plüss et al. |
| 9,710,804 | B2 | 7/2017 | Zhou et al. |
| 10,147,086 | B2 | 12/2018 | Teuwen et al. |
| 10,169,754 | B2 | 1/2019 | Charrat et al. |
| 10,402,216 | B1 * | 9/2019 | Bell ................. G06F 9/455 |
| 10,462,647 | B2 | 10/2019 | Chen et al. |
| 10,475,026 | B2 | 11/2019 | Friedlander et al. |
| 10,664,941 | B1 * | 5/2020 | Osborn ........... G06Q 20/40145 |
| 2011/0283002 | A1 | 11/2011 | King |
| 2012/0178366 | A1 | 7/2012 | Levy et al. |
| 2013/0200999 | A1 | 8/2013 | Spodak et al. |
| 2013/0281055 | A1 * | 10/2013 | Patefield-Smith ...... G06F 21/34 455/411 |
| 2015/0134540 | A1 | 5/2015 | Law et al. |
| 2015/0288684 | A1 * | 10/2015 | Schneider .......... H04L 63/0853 726/9 |
| 2018/0007059 | A1 | 1/2018 | Innes et al. |
| 2019/0034912 | A1 | 1/2019 | Wilson |

FOREIGN PATENT DOCUMENTS

| | | |
|---|---|---|
| EP | 1330770 A1 | 7/2003 |
| EP | 3132404 B1 | 2/2019 |
| EP | 4024242 | 8/2023 |
| GB | 2555401 A | 5/2018 |
| JP | 2000194660 | 7/2000 |
| JP | 2001500999 | 1/2001 |
| JP | 2011238138 | 11/2011 |
| JP | 2017054350 | 3/2017 |
| JP | 6625105 B2 | 12/2019 |
| JP | 2023520842 | 5/2023 |
| JP | 7420961 | 1/2024 |
| WO | WO-0193212 A2 | 12/2001 |
| WO | WO-0196990 A2 | 12/2001 |
| WO | WO-0239369 A1 | 5/2002 |
| WO | WO-2010061068 A1 | 6/2010 |
| WO | WO-2020052753 A1 | 3/2020 |
| WO | 2022144261 | 7/2022 |

OTHER PUBLICATIONS

"Japanese Application Serial No. 2022-554460, Notification of Reasons for Refusal mailed Sep. 19, 2023", with English translation, 6 pages.

"Canadian Application Serial No. 3,171,057, Office Action mailed Oct. 30, 2023", 5 pgs.

"Australian Application Serial No. 2021412311, Response filed Nov. 23, 2023 to First Examination Report mailed May 4, 2023", No Amendments to Claims, 59 pgs.

"Japanese Application Serial No. 2022-554460, Response filed Dec. 13, 2023 to Notification of Reasons for Refusal mailed Sep. 19, 2023", with English claims, 7 pages.

"Canadian Application Serial No. 3,171,057, Voluntary Amendment Filed Sep. 8, 2022.", 8 pgs.

"Mexican Application Serial No. MX a 2022 011293, Office Action mailed Sep. 19, 2022", with machine English translation, 7 pages.

"Korean Application Serial No. 10-2022-7031400, Voluntary Amendment Filed Sep. 8, 2022", with English claims, 41 pages.

"Japanese Application Serial No. 2022-554460, Voluntary Amendment Filed Oct. 17, 2022", with English claims, 10 pages.

"Australian Application Serial No. 2021412311, Voluntary Amendment Filed Oct. 18, 2022", 10 pages.

"Australian Application Serial No. 2021412311, First Examination Report mailed May 4, 2023", 3 pgs.

"International Application Serial No. PCT EP2021 087202, International Preliminary Report on Patentability mailed Jul. 13, 2023", 7 pgs.

"European Application Serial No. 20217596.4, Extended European Search Report mailed May 27, 2021", 5 pgs.

"International Application Serial No. PCT/EP2021/087202, International Search Report mailed Mar. 23, 2022", 4 pgs.

"International Application Serial No. PCT/EP2021/087202, Written Opinion mailed Mar. 23, 2022", 5 pgs.

"Module 1: Smart Card Fundamentals", Smart Card Alliance Certified Smart Card Industry Professional (CSCIP) Accreditation Program, (Oct. 8, 2010), 66 pgs.

"Smartcards and contactless smartcards—Integrator's and Implementer's Guide", Springcard SAS, (2018), 128 pgs.

Chamara, P.M.I., et al., "Contactless Enabled Payment Solution", Final Year Project Report, Project Group 8, U. of Moratuwa, Sri Lanka, (May 15, 2015), 58 pgs.

\* cited by examiner

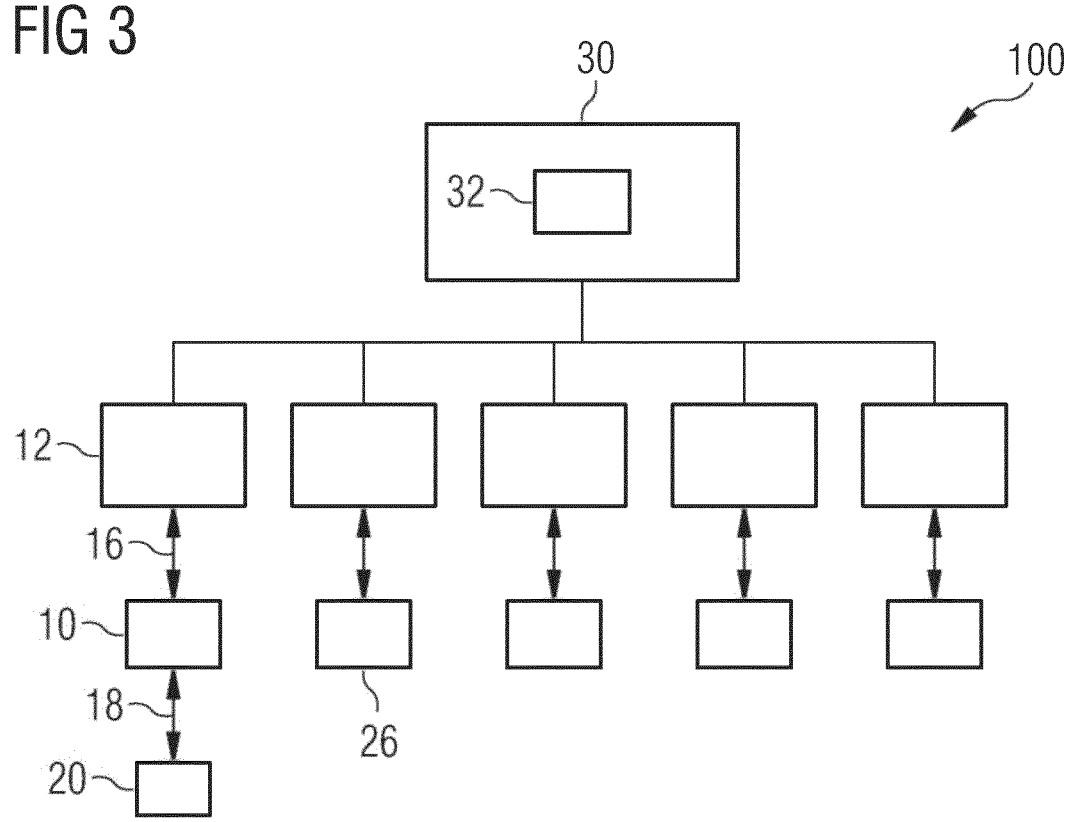

READER DEVICE AND METHOD OF CONFIGURING THE SAME

PRIORITY APPLICATION

This application is a national stage application under 35 U.S.C. § 371 of PCT Appl. No. PCT/EP2021/087202, titled "Reader Device and Method of Configuring the Same," filed Dec. 22, 2021, which claims priority to EP patent application Ser. No. 20/217,596.4, filed Dec. 29, 2020, each of which is incorporated by reference herein in its entirety.

TECHNICAL FIELD

The present disclosure generally relates to reader devices for reading and writing data stored on a token, for example, a smart card, and in particular to a method of configuring such reader devices.

BACKGROUND

Generally, readers such as smart card readers are used for a wide variety of applications. For example, such readers can be used to read data from a security token to allow access to resources such as a physical facility, a computer, or a network. Other well-known applications are the use for online-banking applications, the use as credit card terminals, and the like. As one specific example, HID Global's OMNIKEY® readers are readers for desktop applications, mobile computers, multifunctional devices such as printers, or the like. Such readers may be configured as an easy-to-install USB device suited for all contact or contactless smart card operations such as the above-mentioned access to resources, online-banking or digital signature applications.

The above-mentioned readers can be standalone devices, or can be integrated into, for example, a desktop computer. Further, such readers generally support all major operating systems, and allow for high-speed data transmission between the reader and the host device connected to the same.

In some applications, a plurality of readers may be provided at different locations, for example, within an organization or a building, and may be connected to a central administration device managing different aspects of the plurality of readers.

U.S. Pat. No. 7,971,238 B2 discloses an information handling system including a processor, system memory, and a remote access resource that includes a virtual card reader enabled to establish a communication channel between the remote access resource and a remote card reader to communicate smart card reader access requests and responses between them.

The present disclosure is directed, at least in part, to improving or overcoming one or more aspects of prior systems.

SUMMARY OF THE DISCLOSURE

According to one aspect of the present disclosure, a reader device comprises a memory storing configuration data configuring the reader device. The reader device further comprises a first interface configured to connect the reader device to a host device, a second interface configured to connect a physical token to the reader device, and a controller configured to access the memory to read and write data to/from the same, communicate with the host device via the first interface, and communicate with the physical token via the second interface. In addition, the controller is configured to, in response to a detection that no physical token is connected to the reader device, emulate a virtual token and transmit a first message indicating that the virtual token is connected to the reader device to the host device. In response to receiving at least one command addressing the virtual token from the host device, the controller is further configured to modify the configuration data stored in the memory in accordance with the at least one command.

In another aspect, the present disclosure relates to a system for managing a plurality of reader devices. The system comprises a central administration device, a plurality of host devices, and a plurality of reader devices in accordance with the above aspect respectively connected to the plurality of host devices. The administration device is configured to receive the first message indicating that the virtual token is connected from an associated host device, and transmit the at least one command to the associated host device to configure the reader device connected to the same.

In yet another aspect, the present disclosure relates to a method of configuring a reader device, the reader device including a memory storing configuration data, a first interface configured to connect the reader device to a host device, a second interface configured to connect a physical token to the reader device, and a controller configured to communicate with the host device via the first interface, and access the memory to read and write data to/from the same. The method comprises, in response to detecting that no physical token is connected to the reader device, emulating a virtual token and transmitting a first message indicating that the virtual token is connected to the reader device to the host device. Further, the method comprises receiving at least one command addressing the virtual token from the host device, and modifying the configuration data stored in the memory in accordance with the at least one command.

In a further aspect, the present disclosure relates to a computer program comprising computer-executable instructions, which, when executed by a controller of a reader device, cause the controller to perform the following steps: in response to a detection that no physical token is connected to the reader device, emulating a virtual token and transmitting a first message indicating that the virtual token is connected to the reader device to a host device connected to the reader device; and, in response to receiving at least one command addressing the virtual token from the host device, modifying configuration data stored in a memory of the reader device in accordance with the at least one command.

In yet another aspect, the present disclosure relates to a computer program product storing the computer program of the above aspect.

Other features and aspects of the present disclosure will be apparent from the following description and the accompanying drawings.

BRIEF DESCRIPTION OF THE DRAWINGS

FIG. 3 shows a system for managing a plurality of reader devices in accordance with the present disclosure.

DETAILED DESCRIPTION

Figure 1:
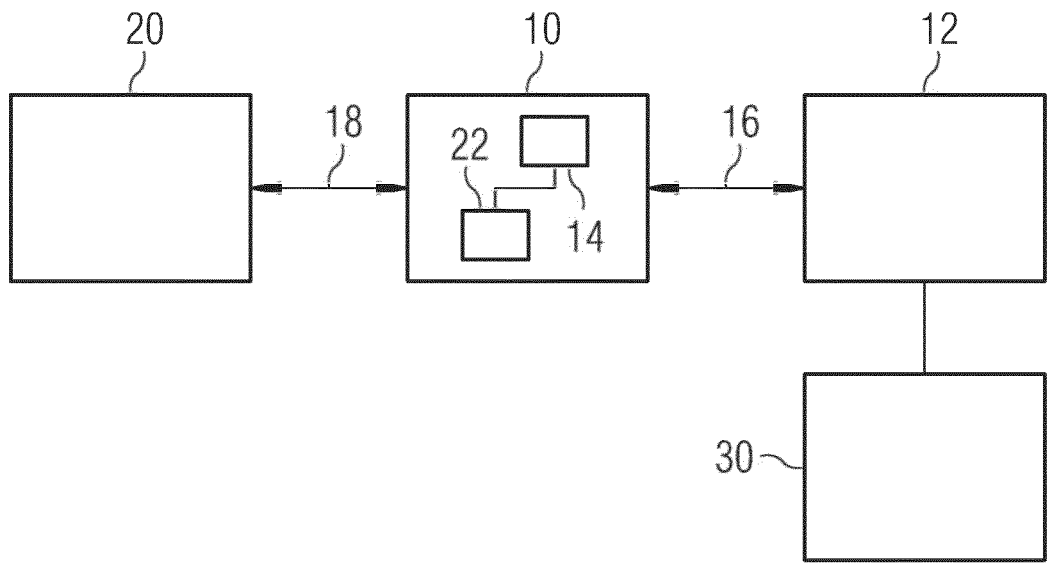
FIG. 1 shows a reader device in accordance with the present disclosure when a physical token is connected to the same.

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of protection. Rather, the scope of protection shall be defined by the appended claims.

The present disclosure is based at least in part on the realization that, in many currently used systems, for example, a networked system including a plurality of reader devices connected to a central administration device, reader configuration management requires different non-standard settings in the supporting operating systems, or even user interaction to connect to a reader. This may prevent the remote or centralized management of a smart card reader population. For example, when a reader device is connected to a host device including an operating system (which may also be a local administration device), a management application may try to access the reader device using special commands, which do not correspond to standard settings of the protocol that is used for communication with the token (for example, a smart card) connected to the reader. In particular, when no token is connected to the reader, any kind of access may simply be refused. Therefore, it may be necessary to first connect a token to the reader in order to configure the same. In addition, it may be necessary to change the standard settings (for example, settings of the operating system and/or the reader) to be able to send the appropriate configuration commands which cause the reader to update its configuration.

Moreover, especially in the case where a central administration device manages a plurality of readers connected to different host devices, the remote connections between the central administration device and the respective host devices must support any special commands which are necessary to remotely configure the respective readers. However, in many applications, this is not assured, even in cases where a local administration device is used. Therefore, administration, in particular, configuration of the reader devices may not be possible in the known systems.

According to the present disclosure, it has been realized that the above-outlined disadvantages can be overcome by configuring the readers such that they emulate a token (virtual token). In particular, this emulation may take place when no physical token is present at a reader. Based on such an emulated token, all token-specific security mechanisms can be used and allow for a secure (remote) configuration management of the reader. No user interaction is required, and a centralized configuration can be executed without performing any special settings to the token subsystem or even on an operating system level of the host device to which the reader is connected.

When the reader emulates such a virtual token, this virtual token (for example, a virtual smart card) can be addressed by commands and methods of the standard that is commonly used to communicate with such tokens. For example, this may allow a communication between the central administration device and each reader using the PC/SC standard without any special configurations or settings. In other words, the (central) administration device communicates with the reader in the same manner it communicates with a physical smart card. Therefore, the reader configuration can be accessed as part of any card command or memory structure using any of the security mechanisms introduced for, for example, smart cards (e.g., secure communication, man-in-the-middle attack detection, etc.).

In addition, it has been realized that the emulated card can also present reader specific information such as a reader serial number or a firmware version of the same to the central administration device to ease the configuration or management processes. This may be done in addition to presenting standard required values like ATR response and the like. In this manner, a management application on the administration device can also distinguish between a physical token and the virtual token, and appropriately address the latter to configure the reader emulating said virtual token. In some embodiments, the reader specific information may be requested by the local or central administration device by sending an appropriate command to the reader, and the controller of the reader may then be configured to read the configuration data, or other data including the reader specific information, in accordance with the request and forward the same to the administration device.

It has also been realized that it is advantageous when the reader enters the token emulation mode whenever a physical token is not present (for example, upon a detection that a physical token has been removed). In this manner, whenever a reader is not currently in use, a remote configuration of the same is possible. In this respect, it has also been recognized that it is advantageous to signal to the administration device that a physical token has been presented to the reader, and terminate the emulation of the virtual token. In this manner, an administrator can recognize that the configuration of the reader is not possible at present. Moreover, it has been recognized that it may be advantageous when the emulation of the virtual token can be switched on and off by customers or installations. In this manner, customers or installations which do not require or do not wish to use the approach described herein may prevent the remote configuration of the respective readers.

FIG. 1 shows one example of a reader device 10 in accordance with the present disclosure. As shown in FIG. 1, reader device 10 comprises a memory 14 storing configuration data configuring the reader device 10. Here, it will be appreciated that memory 14 can be any type of a known non-volatile memory (ROM, EEPROM, flash, etc.) which can store data in a permanent manner, i.e., regardless of whether reader device 10 is connected to a power supply or not, or a volatile memory storing data for as long as reader device 10 is connected to the power supply. It will be readily recognized by the skilled person that the configuration data stored in memory 14 may include, for example, a firmware controlling the operation of reader device 10, different settings for the operation of reader device 10, security data such as cryptographic keys, PIN numbers, user IDs, compatibility settings for connecting reader device 10 to different operating systems and/or different devices, and the like, depending on the application in which reader device 10 is to be used (for example, for identification purposes, online-banking, or the like).

As also shown in FIG. 1, reader device 10 further comprises a first interface 16 configured to connect reader device 10 to a host device 12. For example, first interface 16 may be a USB interface including a USB connector configured to connect to a USB port of host device 12. As previously mentioned, host device 12 may be, for example, a desktop computer or a mobile computer such as a laptop and the like. It will be appreciated that host device 12 will generally include an operating system controlling operation of host device 12, and also facilitating communication between host device 12 and reader device 10 via first interface 16. In some applications, host device 12 may be a computer including an operating system supporting the CCID standard, and may use the corresponding CCID drivers to connect with reader device 10, for example, via a USB connection. It should be appreciated, however, that such a USB connection is only one example, and does not limit first interface 16 to a USB interface. For example, reader device 10 could also be integrated with host device 12 and connected to the same via internal electrical circuitry. Moreover, in some applications, no wired connection between reader device 10 and host device 12 may be present, and instead a wireless interface may form first interface 16.

Reader device 10 further comprises a controller 22 configured to communicate with host device 12 via first interface 16. Controller may be any type of processor or hardware configured to execute instructions, access memory 14, etc., for example, a microcontroller or the like. Further, controller 22 may be operatively coupled to first interface 16 to transmit and receive messages (including one or more commands) to/from reader device 12. In some embodiments, a dedicated communication unit may be connected to first interface 16 and forward the messages between first interface 16 and controller 22. In other embodiments, such a communication unit or circuitry may be integrated with controller 22.

In addition, reader device 10 includes a second interface 18 configured to connect a physical token 20, for example, a contact smart card, to reader device 10. Controller 22 is configured to communicate with physical token 20 via second interface 18. For example, reader device 10 may be a smart card reader for use with any compatible contact smart card. As such, reader device 10 may comprise a receptacle for physical token 20 (e.g., a smart card), and may be electrically connected to the same in a known manner via second interface 18. Also in this respect, it is noted that, in other applications, second interface 18 may be a contactless interface, and physical token 20 may be, for example, an RFID smart card or the like, which is wirelessly connected to reader device 10 in a known manner.

Controller 22 is configured to enable communications between physical token 20 and host device 12 in accordance with a communication protocol such as the PC/SC standard, for example, by receiving data from physical token 20 and forwarding the same to host device 12, and by receiving commands from host device 12, which commands may, for example, be read/write commands forwarded to physical token 20 by reader device 10. Details of such an operation are known to the skilled person and will not be described herein.

As shown in FIG. 1, an administration device 30, for example, a central administration device, may be connected to host device 12, and may be used to configure reader device 10 in a manner which will be described in more detail below. Here, it will be readily appreciated that administration device 30 may be any appropriate computer system or server connected to host device 12 in a wireless and/or wired manner, for example, via the Internet.

As previously mentioned, host device 12 may be a computer running a general-purpose, multi-program operating system such as Microsoft® Windows®, Linux®, or Apple® MacOS X®. Further, it will be appreciated that reader device 10, although referred to as a reader device, is capable of not only reading data from, for example, physical token 20, but also writing data to the same.

In some instances, it may be necessary or desired to update the configuration of reader device 10, in particular, the configuration data stored in memory 14. In order to do so, an administrator may start a corresponding management application on administration device 30 (or, in case of purely local configuration, host device 12), and forward corresponding configuration commands to reader device 10 via host device 12. However, depending on the application, it may be necessary to forward the configuration commands using non-standard settings of the standard which is used to communicate with reader device 10 and/or physical token 20. In one example, in case the known PC/SC standard is used, a special set of PC/SC commands has to be used to directly address reader device 10, instead of addressing physical token 20. However, in case no physical token 20 is connected to reader device 10, and/or the connection between administration device 30 and host device 12 (and/or the connection between host device 12 and reader device 10) does not support such non-standard settings, configuration of reader device 10 is not possible. Therefore, the administrator would either need to access local host device 12 in order to change operation system settings to perform the configuration, or have to insert a physical smart card or the like into reader device 10. In order to overcome this disadvantage, according to the present disclosure, controller 22 is configured to emulate a virtual token 26 and transmit a first message indicating that virtual token 26 is connected to reader device 10 to host device 12 when it is detected that no physical token 20 is connected to reader device 10. For example, controller 22 or a dedicated detection unit connected to the same may be configured to detect that physical token 20 has been removed (in case of a physical connection) and/or disconnected from reader device 10. It will be readily appreciated that there is a wide variety of possibilities for detecting the disconnection of physical token 20 (a mechanical switch, a timeout for a response from a wirelessly connected token 20, a specific message received from token 20, etc.). In any case, after it has been detected that no physical token is connected to reader device 10, controller 22 starts the emulation of virtual token 26. This is shown in FIG. 2.

Figure 2:
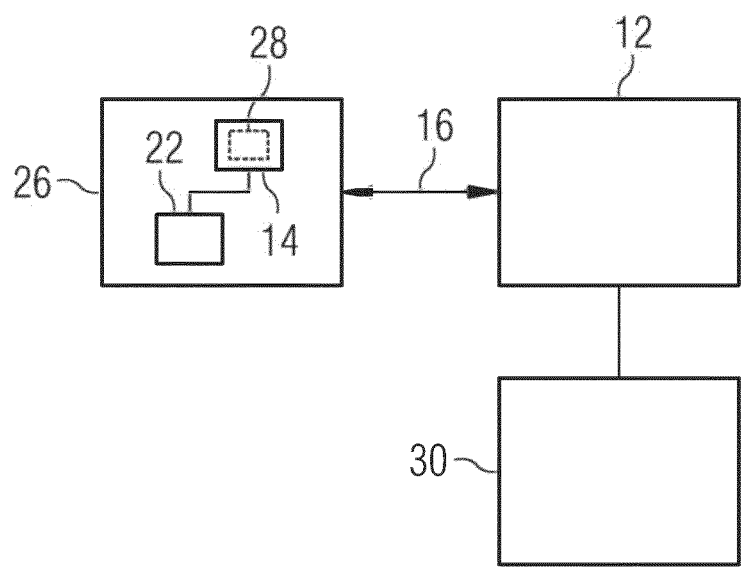
FIG. 2 shows the reader device of FIG. 1 when a virtual token is emulated by the reader device.

In the example shown in FIG. 2, controller 22 emulates virtual token 26 by transmitting the first message indicating that virtual token 26 is connected to reader device 10 to host device 12. In this manner, reader device 10 "impersonates" a token. Thereby, virtual token 26 is considered as being connected to host device 12 via reader device 10, and information concerning the connection of virtual token 26 can be forwarded from host device 12 to administration device 30. Therefore, at administration device 30, it appears that virtual token 26 has been connected to host device 12.

Administration device 30 may now transmit one or more configuration commands for reader device 10 as at least one command addressing virtual token 26. Optionally, administration device can, for example, transmit an initial command requesting reader information, for example, specifying the current configuration of reader device 10. Based on this, a further command for updating the configuration may then be sent to reader device 10. Said at least one command is forwarded by host device 12 to reader device 10 via first interface 16. In response to receiving said at least one command, controller 22 of reader device 10 can then read or modify the configuration data stored in memory 14 in accordance with the at least one command. For example, the at least one command may address a virtual memory 28 of virtual token 26, which virtual memory 28 may include at least a portion of memory 14 storing configuration data. In this manner, standard commands, which are normally used for writing data to a physical token 20, can be used to instead write data into virtual memory 28 of virtual token 26, which virtual memory 28 corresponds to the portion (or, in some embodiments, all) of memory 14 storing the configuration data.

In order to facilitate configuring reader device 10, the first message, which indicates that virtual token 26 is connected to reader device 10, may include reader information indicating at least one property of reader device 10, for example, a serial number of the reader device, a firmware version of a firmware installed on the same, and the like. In addition, the first message may also include information with respect to a memory structure of memory 14 of reader device 10 (and/or virtual memory 28), and this information may be used by administration device 30 to appropriately address virtual memory 28 of virtual token 26. For example, the first message may include information specifying the memory address or memory region into which the configuration data (for example, updated cryptographic keys, a new firmware revision, and the like) is to be written. In some embodiments, the first message may be sent by reader device 10 upon receiving a corresponding request from host device 12. It should be appreciated that the term "emulation" as used herein should be interpreted broadly. In the above-described example, it refers to the reader device 10 (the controller 22 of the same) identifying itself as a token to host device 12 and administration device 30. In this case, it may be necessary to include information in the first message forwarded to administration device 30 specifying the type of token, i.e., informing the administration device 30 that virtual token 26 allowing for the above-described configuration of reader device 10 is connected instead of a physical token 20, which generally would not be addressed in the same manner as virtual token 26. However, it may also be possible that controller 22 emulates virtual token 26 by essentially simulating a token being connected to reader device 10, despite the fact that no physical token 20 is connected. For example, controller 22 could perform a mapping between virtual memory 28 of such a virtual token 26 and the portion of memory 14 storing the configuration settings. Administration device 30 may then forward appropriate write commands for writing data into virtual memory 28 of virtual token 26, which data is then written into the appropriate portion of memory 14 using the mapping.

It may be advantageous that controller 22 is further configured to, in response to a detection that a physical token 20 is connected to reader device 10 while virtual token 26 is emulated, transmit a second message indicating that virtual token 26 is no longer connected to reader device 10 to host device 12. This message can then be forwarded to administration device 30, and an administrator will be informed that currently no configuration of reader device 10 is possible. In this case, the administrator may initiate corresponding measures allowing for a configuration of reader device 10 in case that this is necessary (for example, informing an on-site operator or user that physical token 20 should be removed), or plan accordingly to update reader device 10 at a later time in case the update is not absolutely necessary.

In some applications, it may also be desired by an end user or an institution to selectively activate or deactivate the possibility for remote configuration of reader device 10. For example, an appropriate input or interface may be provided, which allows for selective activation or deactivation based on the user selection. This could be, for example, a physical button, or a software configuration setting which can be used on host device 12 to deactivate emulation of virtual token 26 by reader device 10. In some embodiments, the configuration data stored in memory 14 may include data indicating such a user selection. It will be appreciated that, in case the emulation has been deactivated, and the corresponding configuration data is stored in memory 14, a local reconfiguration will be necessary in order to again activate the possibility of emulation and remote configuration.

As mentioned above, in some applications, for example, smart card applications, controller 22 may be configured to receive a first set of commands in accordance with a first standard (for example, PC/SC) via first interface 16, and forward the first set of commands to physical token 20 when physical token 20 is connected via second interface 18, and the at least one command sent to the virtual token may conform to this first standard and may be executed by controller 22 emulating virtual token 26. In other words, the standard commands used to address a smart card can be used to address reader device 10 instead, and can be executed by controller 22 instead of being passed on to a physical smart card connected to reader device 10. In this example, controller 22 may also be configured to receive a second set of commands outside of the first standard via first interface 16, and execute the second set of commands to modify the configuration data stored in the memory 14 when the physical token 20 is connected via second interface 18. For example, the second set of commands may correspond to the extended commands of the PC/SC standard which can be used to directly address reader device 10.

As previously mentioned, the above-described reader device 10 in accordance with the present disclosure can be advantageously used in connection with a centralized management of a plurality of reader devices using a central administration device 30, as shown in FIG. 3. FIG. 3 shows an exemplary system 100 for managing a plurality of reader devices 10. The system comprises central administration device 30, a plurality of host devices 12, and a plurality of reader devices 10 in accordance with the present disclosure respectively connected to the plurality of host devices 12. As previously mentioned, administration device 30 is configured to receive the first message indicating that virtual token 26 is connected from an associated host device, and transmit the at least one command for configuring reader device 10 to the associated host device.

As shown in FIG. 3, system 100 may further comprise a management application 32 running on administration device 30. Management application 32 may be configured to identify virtual token 26, as well as a memory structure of memory 14 of reader device 10 emulating virtual token 26, based on the first message received from the corresponding host device 12 when virtual token 26 is emulated. Based on this, management application 32 may generate at least one command for configuring reader device 10 in accordance with the identified memory structure. Of course, it may also be possible that management application 32 uses the reader information included in the first message to identify the memory structure of memory 14 and generate an appropriate command.

In some embodiments, administration device 30 may further be configured to receive a third message indicating that a physical token 20 is connected to an associated host device 12, as shown in FIG. 3. In response to this, administration device 30 may transmit a fourth message to the associated host device 12 causing the host device to display a user prompt requesting a user to remove the physical token. For example, a corresponding prompt may be presented on a display of host device 12. In this case, when a user recognizes the user prompt and removes physical token 20, reader device 12 may then again start with the emulation of virtual token 26, allowing for a remote configuration of reader device 12.

INDUSTRIAL APPLICABILITY

With the above-described reader device and system for managing a plurality of such reader devices, an efficient and reliable, in particular remote administration of reader devices becomes possible.

An exemplary method of configuring a reader device in accordance with the present disclosure will be described in the following. In a first step, it is detected (for example, by controller 22) that no physical token 20 is connected to a reader device 10. In response to this, a virtual token 26 is emulated, and a first message indicating that virtual token 26 is connected to reader device 10 is transmitted to host device 12. Here, it will be appreciated that the steps of detecting that no physical token is connected, and emulating a virtual token and transmitting the first message are performed by reader device 10, in particular, controller 22 of the same.

In a subsequent step, reader device 10 also receives at least one command addressing virtual token 26 from host device 12. Said at least one command is generated, for example, by central administration device 30 in the manner described above. Further, the method includes modifying the configuration data stored in memory 14 of reader device 10 in accordance with the at least one command. As described above, the step of modifying is performed by controller 22 of reader device 10, by writing the configuration data into memory 14 in the appropriate manner.

While the above-identified steps are performed by reader device 10, it will be readily appreciated that any number of additional steps will be performed by host device 12 and administration device 30, where appropriate or necessary. For example, it will be readily appreciated that the method includes forwarding the first message received from reader device 10 to administration device 30 via host device 12. Likewise, the method includes the step of generating the at least one command by administration device 30, in particular, management application 32 running on the same. This may be done based on reader information received from reader device 10 together with the first message. Then, the generated at least one command will be forwarded from administration device 30 via host device 12 to reader device 10, which emulates virtual token 26. Of course, it will be readily appreciated that any number of additional steps can be included, in accordance with the previously described further aspects of the reader device and the system in accordance with the present disclosure.

It will also be appreciated that a computer program comprising computer-executable instructions which, when executed by a controller of a reader device 10, cause the controller to perform at least some of the steps of the above-described method is also an advantageous embodiment of the present disclosure. For example, such a computer program could be configured as a firmware update for existing reader devices 10. In other words, an administrator could perform a first update of a configuration of reader device 10 with the firmware update, for example, locally, to thereby allow the updated reader device 10 to perform the emulation described above. Subsequently, any updated reader device may then be configured remotely. In this respect, it will also be appreciated that a computer program product storing the computer program may be distributed to owners or operators of existing systems in order to allow the above-mentioned update and/or configuration.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the general disclosure.

Recitation of ranges of values herein are merely intended to serve as a shorthand method for referring individually to each separate value falling within the range, unless otherwise indicated herein, and each separate value is incorporated into the specification as if it were individually recited herein. All method steps described herein can be performed in any suitable order, unless otherwise indicated or clearly contradicted by the context.

Although the preferred embodiments of the present disclosure have been described herein, improvements and modifications may be incorporated without departing from the scope of the following claims.

The invention claimed is:

1. A reader device, comprising:
 a memory storing configuration data configuring the reader device;
 a first interface configured to connect the reader device to a host device;
 a second interface configured to connect a physical token to the reader device; and
 a controller configured to:
  access the memory to read and write data;
  communicate with the host device via the first interface;
  communicate with the physical token via the second interface;
  in response to a detection that no physical token is connected to the reader device, emulate a virtual token and transmit a first message to the host device indicating that the virtual token is connected to the reader device; and
  in response to receiving at least one command from the host device addressing the virtual token, modify the configuration data stored in the memory in accordance with the at least one command.

2. The reader device of claim 1, wherein the first message includes reader information indicating at least one property of the reader device.

3. The reader device of claim 2, wherein the at least one property of the reader device comprises at least one of a serial number of the reader device or a firmware version of a firmware installed on the reader device.

4. The reader device of claim 1, wherein the controller is configured to, in response to a detection that a physical token is connected to the reader device while the virtual token is emulated, transmit a second message to the host device indicating that the virtual token is no longer connected to the reader device.

5. The reader device of claim 1, further comprising circuitry for selectively activating or deactivating emulation of the virtual token based on a user selection.

6. The reader device of claim 5, wherein the configuration data stored in the memory includes data indicating the user selection.

7. The reader device of claim 1, wherein the virtual token comprises a virtual memory including at least a portion of the memory storing the configuration data, the virtual memory being addressed by the at least one command received from the host device.

8. The reader device of claim 1, wherein the controller is configured to receive a first set of commands in accordance with a first standard via the first interface, and forward the first set of commands to the physical token when the physical token is connected via the second interface, and wherein the at least one command conforms to the first standard and is executed by the controller.

9. The reader device of claim 8, wherein the controller is configured to receive a second set of commands outside of the first standard via the first interface, and execute the second set of commands to modify the configuration data stored in the memory when the physical token is connected via the second interface.

10. A system for managing a plurality of reader devices, the system comprising:
a central administration device;
a plurality of host devices; and
a plurality of reader devices respectively connected to the plurality of host devices, each given reader device comprising:
  a memory storing configuration data configuring the given reader device;
  a first interface configured to connect the given reader device to a respective one of the host devices;
  a second interface configured to connect a physical token to the given reader device; and
  a controller configured to:
    access the memory to read and write data;
    communicate with the respective one of the host devices via the first interface;
    communicate with the physical token via the second interface;
    in response to a detection that no physical token is connected to the given reader device, emulate a virtual token and transmit a first message to the respective one of the host devices indicating that the virtual token is connected to the given reader device; and
    in response to receiving at least one command from the respective one of the host devices addressing the virtual token, modify the configuration data stored in the memory in accordance with the at least one command;
wherein the central administration device is configured to receive the first message from the respective one of the host devices indicating that the virtual token is connected to the given reader device, and transmit the at least one command to the respective one of the host devices to configure the given reader device.

11. The system of claim 10, wherein the central administration device further is configured to receive a third message indicating that the physical token is connected to the given reader device, and transmit a fourth message to the respective one of the host devices causing the respective one of the host devices to display a user prompt requesting a user to remove the physical token.

12. The system of claim 10, wherein the plurality of host devices are configured as a plurality of desktop or laptop computers.

13. The system of claim 12, wherein the plurality of desktop or laptop computers include a plurality of different operating systems.

14. The system of claim 12, wherein the plurality of reader devices are configured as a plurality of contact or contactless smart card readers.

15. The system of claim 10, further comprising a management application running on the central administration device, the management application being configured to identify a memory structure of the memory of the given reader device emulating the virtual token based on the first message, and to generate the at least one command in accordance with the identified memory structure.

16. The system of claim 10, wherein the plurality of reader devices are configured as a plurality of contact or contactless smart card readers.

17. A method of configuring a reader device by a controller, the reader device including a memory storing configuration data, a first interface configured to connect the reader device to a host device, a second interface configured to connect a physical token to the reader device, and the controller, the controller configured to communicate with the host device via the first interface and access the memory to read and write data, the method comprising:
  in response to detecting that no physical token is connected to the reader device, emulating a virtual token and transmitting a first message to the host device indicating that the virtual token is connected to the reader device;
  receiving at least one command from the host device addressing the virtual token; and
  modifying the configuration data stored in the memory in accordance with the at least one command.

18. A computer program product comprising computer-executable instructions which, when executed by a controller of a reader device, cause the controller to perform the following operations:
  in response to a detection that no physical token is connected to the reader device, emulating a virtual token and transmitting a first message to a host device connected to the reader device indicating that the virtual token is connected to the reader device; and
  in response to receiving at least one command from the host device addressing the virtual token, modifying configuration data stored in a memory of the reader device in accordance with the at least one command.

* * * * *